June 4, 1963    L. M. GREENE    3,092,353
DEVICE FOR MEASURING LIFT OF THE SWEPT BACK WING OF AN AIRPLANE
Filed Oct. 26, 1960    3 Sheets-Sheet 1

INVENTOR.
LEONARD M. GREENE
BY
ATTORNEYS

June 4, 1963 L. M. GREENE 3,092,353
DEVICE FOR MEASURING LIFT OF THE SWEPT BACK WING OF AN AIRPLANE
Filed Oct. 26, 1960 3 Sheets-Sheet 2

INVENTOR.
LEONARD M. GREENE
BY
ATTORNEYS

United States Patent Office 3,092,353
Patented June 4, 1963

3,092,353
DEVICE FOR MEASURING LIFT OF THE SWEPT BACK WING OF AN AIRPLANE
Leonard M. Greene, Chappaqua, N.Y., assignor to Safe Flight Instrument Corporation, White Plains, N.Y., a corporation of New York
Filed Oct. 26, 1960, Ser. No. 65,143
19 Claims. (Cl. 244—1)

This invention relates to a device for measuring the lift of a swept back wing of an airplane.

The term "swept back" wing as it is used in the airplane industry denotes a wing having a leading edge which extends outwardly and rearwardly from the fuselage at a marked angle which customarily is at least 20° aft of a perpendicular to the longitudinal axis of the airplane. This type of wing generally is employed in high speed airplanes such, for instance, as turboprop airplanes or jet driven airplanes that have a cruising speed which is related to the speed of sound.

Considerable difficulty has been experienced in connection with lift instrumentation of such airplanes, i.e. airplanes with swept back wings. By the term "lift instrumentation" I refer to all types of instruments and mechanisms including a lift input, that is to say, one into which a lift signal is adapted to be injected. For example, such instruments may comprise meters, i.e. devices designed to be read by a pilot and/or flight engineer to show the value of lift at any given time whereby to assist the pilot and/or flight engineer in manipulating the controls of the airplane.

The term "lift instrumentation" also includes devices which are actuated by a value of lift, e.g. by a predetermined value of lift. This latter type of device may include, for example, a stall warning device which when the lift reaches a certain predetermined value close to stall conditions, will actuate a warning mechanism such as a shaker.

The term "lift instrumentation" also includes indicating devices in which lift is but one component of an input signal fed into the device. For example, the device may be one having plural input signals such as lift together with thrust and/or forward acceleration and/or flap setting.

Still further, the term "lift mechanism" embraces devices having a servo mechanism controlled by a lift input signal or it may include an automatic control mechanism such as an automatic pilot which regulates the elevator controls of an airplane or the throttle. Such latter type of lift instrumentation is useful in controlling the power during landing approach, the automatic control being such as to maintain a predetermined value of lift during this critical period. Such automatic lift instrumentalities also may be arranged to maintain other predetermined values of lift as, for instance to maintain a good value of lift for cruising, as for instance, to attain maximum fuel efficiency or maximum range of flight for a given amount of fuel. In general all of these lift instrumentalities are categorized by the title "lift utilization mechanism."

In an airplane having a conventional or straight wing, i.e. a wing the leading edge of which does not run back at a marked angle to the longitudinal axis of the airplane, that is to say at an angle less then about 20° aft of a perpendicular to the longitudinal axis of the airplane, the lift input signal into a lift utilization mechanism has been provided by a member, such as a flat, i.e. plane, vane, protruding from the wing within the range of influence of the shifting stagnation point of the wing and which member is mounted for movement responsive to a change in the location of the stagnation point about an axis parallel to the skin of the wing and parallel to the leading edge, said member controlling a variable output as a function of the angular position of the member about said axis. Such output, as well as the angular position of the vane, is a function of lift and has been used to supply a lift input signal to various types of lift utilization mechanisms.

The aforesaid type of lift measuring device, i.e. a vane continuously movable over a range about an axis parallel to the leading edge of the airplane wing and parallel to the skin of the wing, also has been employed for swept back wings. This type of lift measuring device has an inherent drawback in its new milieu. It has been found that the measurements provided by such a device are incapable of affording a variable output which is always solely a function of lift. In other words, such output, in addition to being a function of lift is affected by the loading of the wing, i.e. the gross weight of the airplane. Moreover, this weight, i.e. loading, effect varies with the lift. That is to say, at some values of lift the weight effect is greater and at other values of lift the weight effect is smaller or zero, all of these being uncontrollable that is to say, being inherent characteristics of the previous type of lift measuring device if used to measure over a wide range of lift value and gross weights.

I have observed that the weight effect (in measurements of lift) may be minimized for a certain lift value by selection of the orientation of the axis of rotation of said projecting member with respect to the leading edge of the swept back wing of an airplane. For example, if the member is a flat vane and if the axis of rotation thereof is located in a certain angular orientation with respect to the leading edge, the weight effect at a given value of lift, e.g. a value approaching stall, will be negligible or nonexistent. However, for a vane thus oriented the weight effect at a different value of lift, e.g. a value which is the most desirable for landing approach, may be so great as to be unacceptable. Conversely, if the axis of rotation of the vane is so oriented with respect to the leading edge of a swept back wing that the weight effect for a value of lift proper for landing approach is negligible or nonexistent, the weight effect at a value of lift slightly short of stall may be so great as to be unacceptable.

It is an object of the present invention to provide a lift sensing mechanism, i.e. a lift measuring device, for a swept back wing of an airplane which is not subject to the foregoing drawbacks.

It is another object of my invention to provide a lift sensing mechanism of the character described which has substantially no weight effect for different and even widely separated values of lift, that is to say, a mechanism which will measure a range of values of lift and which measurements are not markedly affected by changes of weight for any of these different values of lift, unless such an effect is desired. It is another object of my invention to provide a lift sensing mechanism of the character described which is capable of use with any kind of lift utilization mechanism, that is to say, which will furnish a lift signal that will provide a lift input that can be used alone or in conjunction with other inputs.

It is another object of my invention to provide a lift sensing mechanism of the character described which can be controllably modified to include any desired weight effect.

It is another object of my invention to provide a lift sensing mechanism of the character described which can be made as sensitive to lift as is desired for any given condition of use.

It is another object of my invention to provide a lift sensing mechanism of the character described which is small, compact, reliable, accurate and durable.

It is another object of my invention to provide a lift sensing mechanism of the character described which can be easily and quickly installed and will yield reliably reproducible results.

It is another object of my invention to provide a lift sensing mechanism of the character described which constitutes relatively few and simple parts and is comparatively inexpensive to make, install and maintain.

Other objects of my invention in part will be obvious and in part will be pointed out hereinafter.

My invention accordingly consists in the features of construction, combination of elements, and arrangements of parts which will be exemplified in the devices hereinafter described, and of which the scope of application will be indicated in the appended claims.

In the accompanying drawings, in which are shown various possible embodiments of my invention.

Figures 1, 2, 3, 4, 5, 6, 7:
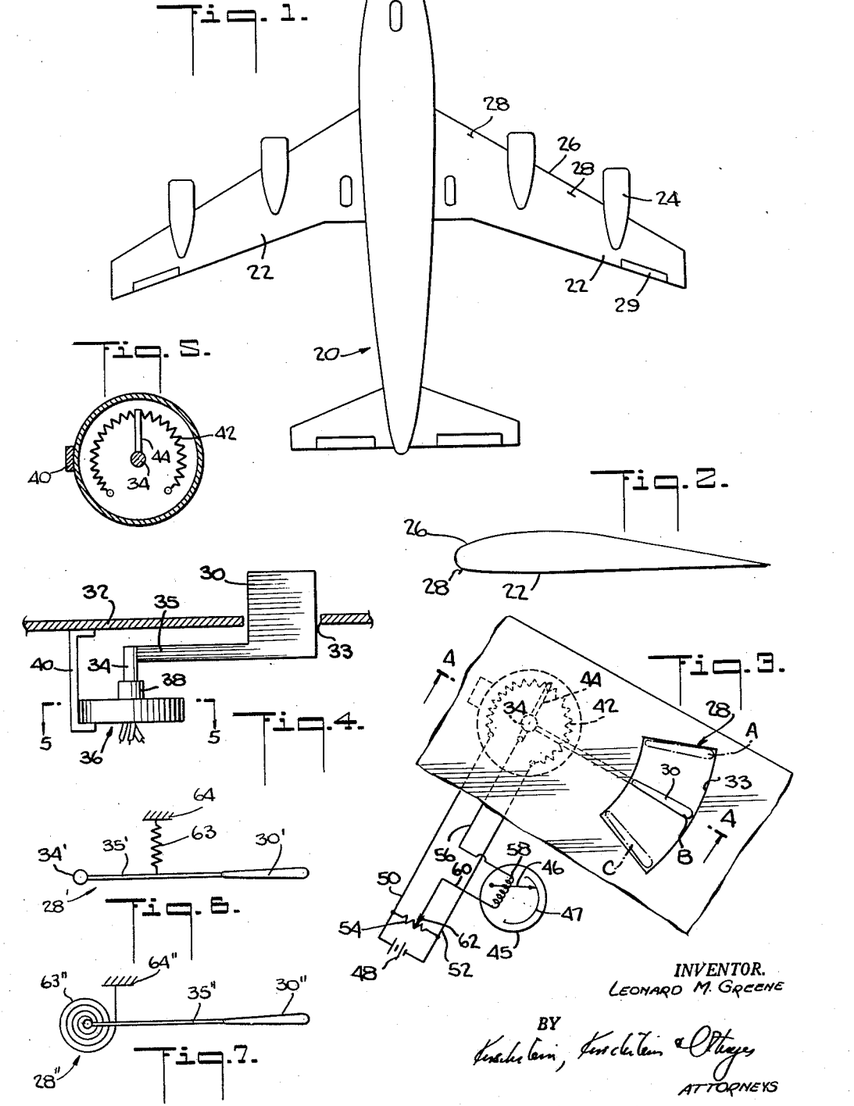
FIG. 1 is a bottom view of an airplane having swept back wings on which is mounted a lift measuring device constructed in accordance with my present invention, two alternative positions for such devices being illustrated.
FIG. 2 is a fore-and-aft sectional view of the wing in the vertical plane of said device.
FIG. 3 is an enlarged fragmentary bottom view of the wing in the region of said device and also illustrating the circuit of a lift utilization mechanism associated with said device.
FIG. 4 is a sectional view taken substantially along the line 4—4 of FIG. 3.
FIG. 5 is a sectional view taken substantially along the line 5—5 of FIG. 4.
FIG. 6 is a schematic view of a lift measuring device similar to that illustrated in FIG. 3, but employing a spring loading means to induce other variables such as weight effect.
FIG. 7 is a view similar to FIG. 6, but illustrating another type of spring loading means.

Referring now in detail to the drawings, and more particularly to FIG. 1, the reference numeral 20 denotes a high speed airplane having swept back wings 22. The airplane is powered by four jet engines 24 located in pods suspended from the lower surface of the wing. The reference numeral 26 denotes the swept back leading edge of each wing. It will be observed that the angle of the leading edge of the swept back wing in the particular airplane shown is about 30°; however, this angle may be as little as 20°, or may be considerably greater than 30°, as is well known to the designers of aircraft.

When such a wing, i.e. a swept back wing, experiences forward motion in air the direction of the local flow of air in the region of influence of the shifting stagnation point as a function of the lift of the wing is characterized by a variation in angle with respect to the leading edge, said direction of flow being in a plane which is substantially parallel to the skin of the wing at the point at which the direction of flow is observed. Such direction of flow customarily has an appreciable outboard component. That is to say, the direction of the local flow of air in the region of influence of the shifting stagnation point and adjacent the skin of the swept back wing is in a general sense from inboard toward outboard, or, phrased differently, from the root of the wing toward the tip of the wing. As the lift of the wing varies so does said direction of such local flow. In other words, said direction of local flow changes as a function of the lift of the swept back wing, the change being such that as the lift increases the direction of local flow rotates forwardly. Phrased differently, at lower values of lift the direction of local air flow has a substantial aft (rearward) component as well as an outboard component. As the value of lift increases the aft component decreases and the outboard component becomes more predominant. Depending upon the location of the lift measuring device as the lift increases further the aft component may disappear entirely and may be replaced by a fore (forward) component. Thus in effect, the direction of local air flow in the region of influence of a shifting stagnation point in a swept back wing of an airplane adjacent the skin of the wing experiences a change in orientation which is increasingly forward as an increasing function of lift.

I have taken advantage of this behavior of said local air flow by providing a novel lift measuring device including a means, such for example as a vane, which is angularly movable with respect to an axis having a substantial component normal to the adjacent skin of the swept back wing and continuously responsive to the direction of local flow of air in the region of influence of the shifting stagnation point of said wing, and further including a means, e.g. a transducer, controlled by the angularly movable means to provide an output which is variable as a function of said local direction of flow, said output being injectable into a suitable lift utilization mechanism.

More particularly referring to FIG. 1, the reference numeral 28 denotes a lift measuring means embodying my invention. In its preferred use, the sensing portion of my new device is located at a site in which the local air flow in the region of influence of the shifting stagnation point experiences considerable angular movement between the extreme values of lift to be measured. Such a site customarily is near the leading edge of the swept back wing on the under surface thereof. Desirably the site chosen is one where the local flow of air is relatively undisturbed by any influence other than movement of air over the wing. For this reason the site ordinarily will be one which is displaced span-wise from the ailerons 29 and from the pods 24. Two appropriate sites for the sensing portion of the instrument 28 are indicated in FIG. 1, these being between the root of the wing and the inboard pod and between the inboard and outboard pods.

The chordwise location of said site is better shown in FIG. 2. This close to the leading edge of a swept back wing the direction of local flow of air between the extreme values of lift that will be encountered experiences a change of considerably more than 90°. Even within the range that is most usable for lift instrumentation, i.e. the range between the value of lift corresponding to impending, that is imminent, stall and the proper value of lift for take off and landing approach, the local flow of air in selected locations may vary as much as 40° so that a highly sensitive and, therefore, accurate measurement of lift can be obtained.

The structural details of my new lift measuring device 28 are shown in FIGS. 3-5. As there will be seen, said device comprises a flat, i.e. plane, vane 30 suitably mounted to extend from the skin 32 of the wing in a plane having a substantial component normal to the skin adjacent the site of the device. Said vane desirably is fabricated from a comparatively rigid material such as metal, e.g. aluminum.

To minimize the effect of detrimental conditions, e.g. icing, the vane is supported from within the wing of the airplane and projects through an opening 33 in the skin. Said vane is carried on a shaft 34, as by means of an arm 35 radially extending from said shaft, the vane being located on the trailing, i.e. outboard, side of the shaft, or, considered conversely, the shaft being located inward, i.e. inboard, of the vane so that the vane trails with respect to the shaft, keeping in mind that the direction of local air flow has an appreciable outboard component.

Said shaft 34 has an axis of rotation that has a substantial component normal to the adjacent skin of the wing. The term "susbtantial" as used in this context means that the axis of rotation is located within a right circular cone having an altitude normal to the adjacent skin of the wing and a slant height of 60° to the altitude so that the axis of rotation of said shaft 34 (the axis of rotation of the vane 30) does not deviate more than 60° from a position normal to the adjacent skin of the wing.

Inasmuch as the vane 30 will turn about the shaft 34 as a center the vane will sweep an arcuate path. The opening 33 accommodates, and, desirably, defines this path and the two outer radial edges of the opening limit the oscillatable movement of the vane. The forward, i.e. fore, radial edge of the opening desirably defines the position of the vane 30 at a lift condition approximating or just short of stall. The center of the opening between the two radial edges corresponds to a vane position for a value of lift that is proper for correct takeoff or landing approach. The other, i.e. aft (rearward) radial edge of the opening 33 is symmetrical with the forward radial edge about the aforesaid central position. It may be mentioned, however, that providing the opening 33 is sufficiently large to permit the vane to move between an imminent stall position and a proper position for correct takeoff and landing approach, my invention will be effectively carried out. Nevertheless, the opening 33 desirably is made larger to permit travel of the vane over a greater range for various other purposes, e.g. symmetry of instrumentation or extreme operating conditions, i.e. operating conditions at low values of lift that may prevail at high cruising speeds.

In the illustrated lift measuring device 28 the shaft 34 is located behind the skin of the wing in a position which is substantially perpendicular to said skin at the site of the device. The shaft is suitably journalled to provide the indicated axis of rotation.

Associated with the vane 30 and shaft 34 is a transducing mechanism 36 to convert the change in angular position of the vane and shaft into an output, i.e. signal, which is variable as a function of such position.

In FIGS. 3–5 the transducing mechanism 36 simply constitutes a potentiometer, said shaft 34 being the potentiometer shaft and being conventionally journalled for rotation about its longitudinal axis in the casing of the potentiometer. The shaft bearing, as is usual, is provided by the potentiometer gland, i.e. bearing 38. It will be appreciated that, if desired, independent bearings may be employed to mount the shaft 34 for rotation about the desired axis with respect to the airplane structure, i.e. with respect to the skin of the airplane. The potentiometer and, therefore, the shaft 34 and, accordingly, the vane 30 are mounted on the airplane structure, that is to say, on the airplane skin as by a bracket 40. Within the potentiometer casing there is located the usual circular resistance winding 42 over which there rides in slidable contact therewith the rotatable tap arm 44 that is secured to the shaft 34 so that as the vane 30 moves between various angular positions the tap arm 44 will assume corresponding different angular positions on the resistance winding 42.

The friction between the arm 44 and resistance winding 42 is maintained low so as to minimize its effect on movement of the vane 30, whereby in essence said vane 30 is free-swinging, that is to say, it will faithfully (like a weather vane) follow the direction of flow of the local air mass at the mounting site of the lift measuring device, the inboard edge of the vane pointing directly into the direction of flow of said local air mass and the vane being parallel at all times to said direction of flow.

When the attitude of the wing, that is to say, the angle of attack of the wing, is high with respect to the air in the vicinity of the wing, the direction of local air flow at the site of the lift measuring device (near the leading edge and on the under surface of the wing) will have both a fore component and an outboard component so that the vane will swing to near the fore radial edge of the opening 33 as indicated by the dot-and-dash position A. In the device shown the vane assumes this position, or, in other words, the air flow is oriented in such direction shortly before stall, this representing a dangerous condition of flight and one of which the pilot should be made aware so that the condition can be corrected before disaster ensues.

The central fuel-line position of the vane indicated by the reference character B (this being exemplificative) represents a direction of flow of the local air mass at the site of the lift measuring device which corresponds to a condition of lift that is proper for good takeoff and landing approach. The lift at this time is of a medium value, neither too high for safety nor too low for a flat landing approach angle or a rapid angle of climb.

The other extreme position of the vane indicated in dot-and-dash lines by the reference character C corresponds to the direction of local air flow at the site of the device for a low value of lift. Location of the vane at this position is an indication that the attitude of the airplane should be corrected for proper takeoff or landing approach and that the airplane is traveling too speedily for these maneuvers.

I have observed that with a free swinging (unbiassed) movement of the vane the angular position thereof (disregarding mechanical hysteresis) is substantially exclusively a function of the value of lift, that is, independent of extraneous factors such for instance as the loading of the wing. Thus, the position of the vane will be the same at any given value of lift, e.g. at imminent stall or at a value of lift proper for takeoff or landing approach, regardless of changes in gross weight and, therefore, the output from the lift transducer 36 is usable as a substantially pure lift signal in any type of lift utilization mechanism.

By way of example, in FIG. 3 I have illustrated diagrammatically, in conjunction with the lift measuring device 28, an extremely simple type of lift utilization mechanism, to wit, one that furnishes a visual indication of lift, as in a meter which may be disposed in the instrument array in a cockpit. Said lift utilization mechanism comprises a meter 45, e.g. of the D'Arsonval galvanometer type, having a needle 46 which traverses a reading scale 47. The scale may be marked to indicate units of lift or the needle simply may be read by observing the angular position of the needle 46; one extreme of movement may indicate imminence of stall, the other extreme of movement may indicate too low a value of lift, and the central or null position may indicate a proper value of lift for takeoff or landing approach. A suitable circuit is used to energize the transducer 36 and connect it to the read-out meter 45.

The aforesaid circuit includes a source of electric energy, e.g. a battery 48, connected, as by leads 50, 52, across the resistance winding 42 of the transducer potentiometer. Another resistance winding 54 of a second potentiometer likewise is connected across the leads 50, 52 in parallel with the resistance winding 42. A lead 56 connects the movable tap 44 of the transducer potentiometer to one terminal of the energizing coil 58 of the galvanometer 45. A lead 60 connects the movable tap 62 of the second potentiometer to the other terminal of the galvanometer coil.

The second potentiometer is provided for setting the null postion of the galvanometer. For this purpose its movable tap 62 may initially be so set that at a value of lift correct for landing approach or takeoff the galvanometer needle 46 will be at its central or null position. A suitable marking may be furnished on the face of the galvanometer to indicate a lift condition of imminent stall.

Moreover, if desired, the lift signal between the movable taps of the two potentiometers may be utilized to energize a relay which will render operative a warning signal when the output from the transducer corresponds to a vane position of imminent stall. It also will be appreciated that the lift output signal from the two potentiometers may be injected into any of the other mentioned and known types of lift utilization mechanism. Also any such utilization mechanism may have simultaneously injected therein signals of other variables which it may be desired to mix with the lift signal in a controlled manner. Typical thereof are signals the value of which are responsive to forward acceleration, ground plane acceleration, thrust, power, loading, flap setting, etc.

In addition, if desired, the circuit and lift utilization mechanism can be further modified, as is well known in the field of airplane control to vary the sensitivity of the lift output signal, that is to say, the amplitude of change of the signal for any given variation in lift.

It has been mentioned heretofore that with a free swinging vane that is angularly movable with respect to an axis having a substantial component normal to the adjacent skin of the swept back wing and continuously responsive to the direction of local flow of air in the region of influence of the stagnation point of the wing, the orientation of the vane is a substantially exclusive function of the lift of the wing and is not influenced to any marked degree, and particularly not in uncontrollable degree, by other variables. However, sometimes, and even frequently, it is desirable deliberately to introduce such other variables in a controlled fashion and I have discovered that this can be accomplished by spring loading the vane to a position corresponding to some particular value of lift. Excellent results are secured when the value of lift to which the vane is spring loaded is that corresponding to the lift value for which the transducer is nulled, e.g. the value of lift for takeoff or landing approach, although it is to be understood that my invention is not to be so restricted except to the extent set forth in the appended claims.

In FIGS. 6 and 7 I have schematically illustrated two different typical ways of spring loading the vane. The principal parts of the instruments shown in both these figures are essentially similar to those of the instrument 28 and therefore, will be indicated by the same reference numerals, being differentiated by primes and double primes.

Thus, the instrument 28′ shown in FIG. 6 includes a vane 30′, a shaft 34′ and an arm 35′ connecting the shaft to the vane. The location of the shaft, the arm and the vane of the instrument 28′ are identical to the location of the shaft, the arm and the vane of the instrument 28 already described in considerable detail. The only difference between the instrument 28′ and the instrument 28 resides in the fact that the instrument 28 has a free swinging vane whereas in the instrument 28′ the vane 30′ is spring loaded by a helical spring 63. One end of the spring is secured to the arm 35′ and the other end to a stationary anchor 64, e.g., located within and carried by the skin of the wing or by a structural member within the wing. Said spring 63 acts both as a tension and compression spring and in its idle (unstressed) position locates the vane 30′ in a desired angular position, e.g., the position corresponding to a value of lift desired for takeoff or landing approach. The spring is so located within the device or within the wing as to properly position the vane in the manner indicated and, if desired, either end of the spring can be adjustable, as with a screw, to set the null position of the vane at the selected predetermined position.

It also will be appreciated that the strength of the spring will be selected to provide the desired degree of spring loading and thereby control the amplitude of the variables which are introduced.

One variable which is thus introduced is that of wing loading (gross weight of the airplane). The stronger the spring, the greater will be the loading effect, the weight loading effect increasing to both sides of null position for the spring-loaded vane.

The instrument 28″ shown in FIG. 7 includes a vane 30″, a shaft 34″ and an arm 35″ which are the same as the corresponding elements of the instruments 28 and 28′. Said instrument 28″ is spring loaded by a spring 63″ of spiral configuration having its inner end connected to the shaft 34″ and its outer end connected to a stationary anchor 64″. The spring torsionally biases the shaft 34″ and, therefore, the vane 30″ to a desired predetermined null angular position, e.g., the one corresponding to a predetermined value of lift for takeoff and landing approach. The anchor point 64″ may, as in the case of the anchor point 64′, be adjustable relative to the associated end of the spring in order to set the desired idle (null) angular position of the vane and a spring 63″ of proper strength for the desired loading is employed.

Due to the construction of the transducer 36, that is to say, to the sliding contact between the movable arm 44 and the resistance winding 42 of the potentiometer, it is difficult to minimize the frictional restraint imposed upon the free-swinging movement of the vane 30. This frictional restraint, which imposes a mechanical hysteresis, can be appreciably lowered by utilizing a more sophisticated type of transducer, such as the transducer 70 illustrated in FIGS. 8 and 9.

Figures 8, 9, 10, 11, 12, 13:
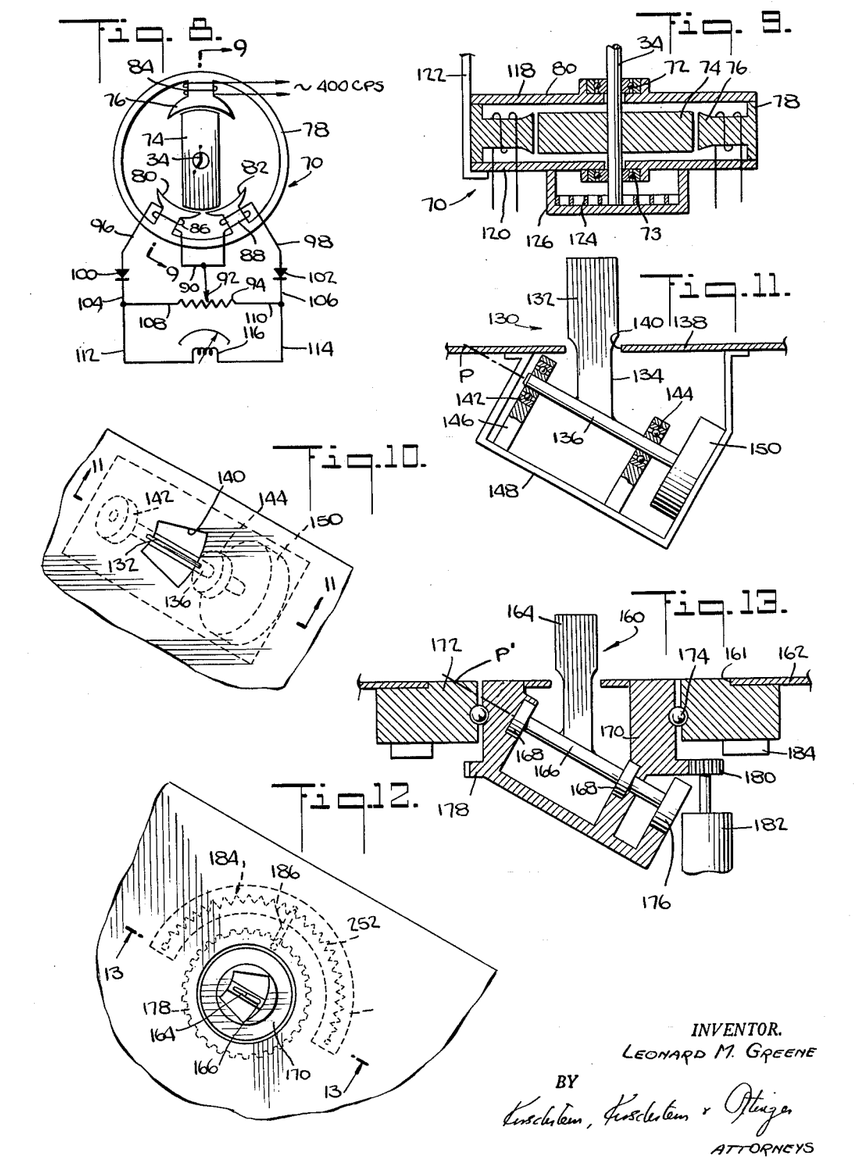
FIG. 8 is a view similar to FIG. 5, the same showing an alternative form of means to transduce the angular position of lift sensing member into a variable electrical output.
FIG. 9 is a sectional view taken substantially along the line 9—9 of FIG. 8.
FIG. 10 is a view similar to FIG. 3 of a lift measuring device embodying another modified form of my invention.
FIG. 11 is a sectional view taken substantially along the line 11—11 of FIG. 10.
FIG. 12 is a view similar to FIG. 3 of a lift measuring device constructed in accordance with another modified form of my invention.
FIG. 13 is a sectional view taken substantially along the line 13—13 of FIG. 12.

Said transducer 70 is of a magnetic type, i.e., one which utilizes changes of flux in magnetic circuits rather than a variable resistance type transducer such as the transducer 36. The angular lift input to the transducer 70 constitutes the shaft 34 which is driven by the vane 30 (not here illustrated). Said shaft is journalled in a pair of anti-friction bearings 72, 73, e.g., roller bearings or jewelled bearings which are supported from the skin or internal structure of the swept back wing.

Mounted to rotate with the shaft 34 is an armature 74 of magnetic material, e.g., soft iron, the ends of the armature being curved to lie in a common circle concentric with the shaft. The shaft and armature are disposed to variably connect two magnetic paths which include a common magnetic pole 76. Said pole is magnetically integral with an annular band 78 of magnetic material in the form of a circle concentrically located with respect to the shaft 34.

One of the magnetic paths further includes a second magnetic pole 80 and the other magnetic path includes a second magnetic pole 82. Both poles 80, 82 are magnetically integral with the band 78 and are jointly diametrically opposed to the pole 76. The faces of the poles 76, 80 and 82 are curved to lie on a common circle concentric with the axis of rotation of the shaft 34 and of a radius slightly larger than the radius of the ends of the armature 74.

The poles 80, 82 are arranged end to end and conjointly cover an arc of about the same angular length as the arc of the pole 76 so that as the armature 74 turns between two extreme positions in one of which it is fully magnetically coupled with one of the poles 80 and in the other of which it is fully magnetically coupled with the other pole 82 it will remain in full magnetic coupling with the pole 76. The armature also will be fully magnetically coupled with the pole 76 as it turns between intermediate positions between its two extremes.

The two extreme positions approximately correspond to the extreme positions of the vane 30 permitted by abutment with the radial edges of the opening 33. Thus it will be apparent that the armature 74 will couple the pole 76 magnetically with either of the two poles 80, 82 or partially with both of said poles, depending upon the angular position of the armature.

The pole 76 is the power input pole and the poles 80, 82 the output poles. A power input winding 84 is provided on the pole 76, the same being energized from a suitable source of fluctuating current such as a source of alternating current, a typical source found on an airplane being a 400 cycle per second alternating current. The pole 80 is provided with an output winding 86 and the pole 82 with an output winding 88. Thereby, when the vane is in one of its extreme positions, e.g. that corresponding to imminent stall, one of the output windings, e.g. the output winding 86, will be at maximum energization; and when the armature is in its other position, i.e. that corresponding to a vane position for a very low load, the other output coil 88 will be at maximum energization. The arrangement preferably is such that both coils 86, 88 are energized to the same partial degree in the intermediate null position of the vane 30, such for instance as that corresponding to the value of lift predeterminately desired for takeoff or landing approach.

One pair of terminals of the coils 86, 88 are connected in common by a lead 90 to the movable tap 92 of a potentiometer resistance winding 94. The other terminals of the output coils 86, 88 are connected by leads 96, 98 through polarizing rectifiers 100, 102 and leads 104, 106 to leads 108, 110 that run to the two terminals of the resistance winding 94. Adjustment of said potentiometer enables me to vary the null or balance point without actually physically reorienting the armature 74 with respect to the vane 30 in order to set the null point where desired. The leads 104, 106 are connected by leads 112, 114 to a utilization mechanism 116 such as a D'Arsonval galvanometer, it being appreciated that, as indicated earlier herein, any other type of utilization mechanism employing a lift input may be similarly supplied with lift intelligence.

The casing for the transducer 70 may have as its side walls the band 78 and for its top and bottom walls may include non-magnetic plates 118, 120. Said casing is suitably secured to the wing, as by a bracket 122.

As mentioned hereinabove, the transducer 70 due to its greatly lessened friction, reduces mechanical hysteresis.

In one of the preferred forms of my invention the lift measuring device is spring loaded and, for this purpose, the device 70 includes a spiral torsion spring 124 housed within a protuberance 126 on the lower plate 120. The inner end of the spring is attached to the shaft 34 and the outer end to the protuberance 126.

Mention may be made of the ability to vary the configuration of the faces of the poles 76, 80, 82 if it is desired to modify the functional relationship between the angular position of the vane (the local direction of air flow in the region of influence of the shifting stagnation point of the swept back wing) and the output of the transducer whereby to secure any desired relation between the value of lift and the transducer output. For example, if with components of uniform dimensions the transducer output is not a linear function of the value of lift it may be made a linear function by appropriate changes in the dimensions of the magnetic circuits, such for instance as employing pole faces of varying dimensions.

It sometimes is desirable in the use of my novel lift measuring device (1) to secure a motional advantage (kindred to a mechanical advantage) in the relationship between angular movement of the vane and angular movement of the pivotal shaft that supports the vane whereby to enable the shaft to experience a greater angle of movement than the angle of movement of the vane across the skin of the wing, or (2) to minimize the shift in chordwise position of the vane so as to restrict movement of the vane to a limited site, or (3) to clear obstructions e.g. a spar within the wing, or (4) to increase the amount of torque available to rotate the transducer for a given size of opening in the wing and for a given angular movement of the vane. All or any one of these advantages can be obtained by skewing the rotational axis of the pivot shaft away from a position perpendicular to the adjacent skin of the wing at the site of the device so that the axis of rotation has a substantial component with respect to such normal. This skewing has been mentioned earlier herein and it is to be iterated here that the skewing must not be more than 60° away from said normal position to the adjacent skin of the wing.

A lift measuring device 130 which utilizes the aforesaid skewing is illustrated in FIGS. 10 and 11. Said device comprises a plane vane 132 having a constricted base 134. The vane is mounted on a shaft 136 lying in the plane of the vane and protrudes forwardly perpendicular to the skin 138 of the wing through an arcuate opening 140 in said skin. The vane extends substantially perpendicularly to the skin of the wing, the position thereof being as shown in FIGS. 1 and 2. The shaft 136 is at an angle of about 45° to a line perpendicular to the adjacent skin of the wing as is quite clear from inspection of FIGS. 10 and 11. This arrangement permits the vane, in effect, to swing through an arc about a point P on the surface of the wing inboard of the vane and in an extension of the plane of the vane. For a skew angle of 45° for the shaft 136 a given angular movement of the vane will engender an appreciably larger angular movement of the shaft. For example, a vane movement of about 28° about said point in the surface of the skin of the wing will cause the shaft 136 to turn through about 40°.

The vane 136 is journalled in anti-friction bearings 142, 144 secured, as by brackets 146, to a casing 148 for the device 130. The casing itself is attached to the structure of the wing, e.g. to the interior surface of the skin of the wing. The shaft 136 actuates a transducer 150, such, for instance, as a resistance type transducer 36 or a magnetic type transducer 70. Optionally, a spring loading means such as has been described with respect to FIGS. 6, 7 and 9 may be employed in connection with the shaft 136.

In the forms of my invention thus far described, the means responsive to the direction of local air flow, that is to say the vane which projects from the skin of the wing, is swung to any particular position by the dynamic pressure of the moving local air acting on the vane; that is to say, the vane moves to an equilibrium position in which the forces of the moving local air acting on it are in equilibrium in the event that the vane is unbiased, and are in equilibrium with the biasing means in the event that the vane is biased, and, in either instance, the forces of the moving local air acting on the vane are the principal factors in directly positioning the vane. It is for this reason that in the forms of my invention thus far described, the axis about which the vane turns and which has a substantial component normal to the adjacent skin of the wing, is inboard of the vane so that the vane trails. However, I wish it to be understood that my invention is not to be so limited. It is within the scope of my invention to locate the aforesaid axis of rotation near the center of the vane or even outboard of the vane and to utilize the forces of the moving local air acting on the vane to control a power means for positioning said vane, e.g. a servomotor which rotates the vane about an axis having a substantial component normal to the adjacent skin of the wing. In such event the vane is additionally mounted for movement about a second axis which has a substantial component parallel to the adjacent skin of the wing, movement of said vane about this second axis being used to sense the deviation of the angular orientation of the vane from the direction of local flow of air and to feed a signal to the power means that varies the angular position of the vane about the first axis.

In FIGS. 12–16 I have illustrated lift measuring devices embodying such modified forms of my invention, two such modified devices being shown. In the first device the second axis of rotation of the vane is at an angle to the skin of the wing and in the second device the second axis of rotation of the vane is parallel to the skin of the wing.

Figures 14, 16:
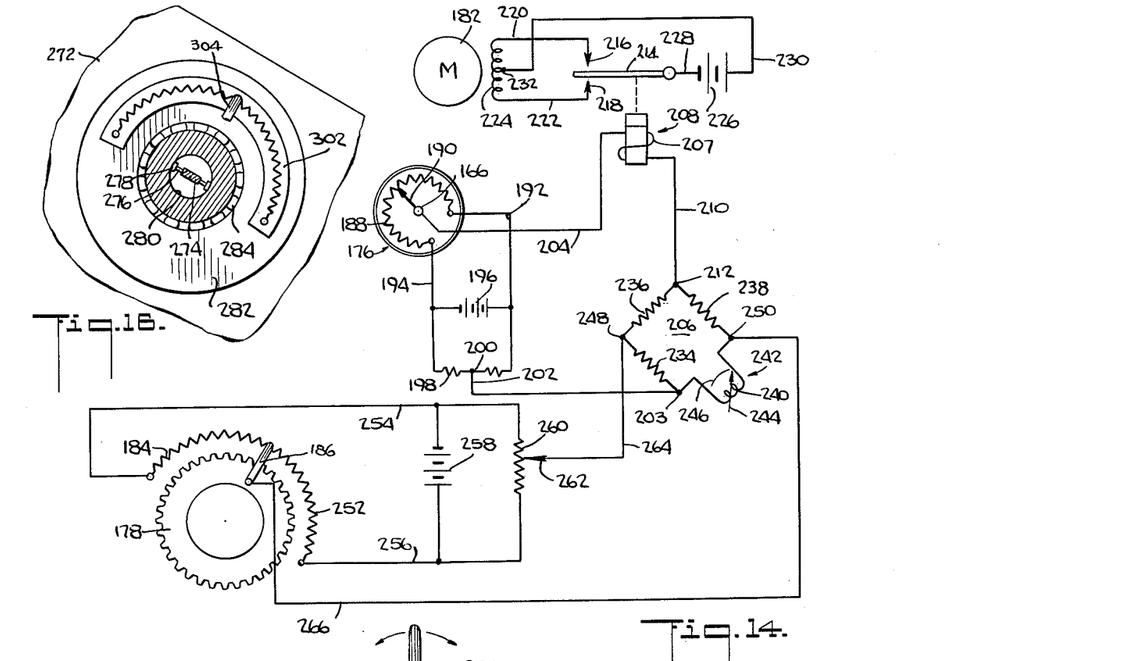
FIG. 14 is a diagram of an electric circuit forming part of the device shown in FIGS. 12 and 13.
FIG. 16 is a sectional view taken substantially along the line 16—16 of FIG. 15.

More specifically, referring to FIGS. 12, 13 and 14, the reference numeral 160 denotes the first aforesaid modified lift measuring device embodying my invention. Said device is mounted in an opening 161 in the skin 162 of the wing near the leading edge thereof and on the undersurface of the wing. The position of said device 160 is the same as the position of the device 28 earlier described with reference to FIGS. 1 and 2.

The device 160 includes a plane vane 164 fixed to turn with a shaft 166 the ends of which are journalled in bearings 168. Said bearings are carried in a casing 170. The casing is mounted in a sleeve 172 which is fast to the skin 162 of the wing or otherwise suitably secured in a rigid manner to internal structural members of the wing. The bearings 168 hold the shaft 166 for rotation about an axis having a substantial component parallel to the adjacent skin of the wing. Said axis intersects the skin of the wing at a point P′ inboard of the vane 164.

Antifriction bearings, such as ballbearings 174, roll in cooperating races formed in the sleeve 172 and casing 170 thereby journaling the casing 170 in the sleeve 172 for rotation about an axis perpendicular to the skin of the wing. Said axis, as shown, extends through the longitudinal center of the vane 164 when said vane is in centered position, i.e. perpendicular to the skin of the wing. The shaft 166 drives a transducer 176, here shown as constituting a resistance transducer, or potentiometer.

Mounted on to turn with the casing 170 is a gear 178 engaged by a drive pinion 180 that is rotated by the output shaft of a reversible motor 182. The variable resistance of a second potentiometer 184 is secured to the stationary structure of the airplane, e.g. to the sleeve 172, the movable tap 186 of said potentiometer being driven by the gear 178 or casing 170. Thus the potentiometer 184 is a transducer for the angular position of the casing 170 with respect to the sleeve 172 while the potentiometer 176 is a transducer for the angular position of the vane with respect to the casing 170.

It will be appreciated that rotation of the casing 170 within the sleeve 172 will permit the vane 164 to be lined up with the direction of local air flow and that movement of the vane 164 about the axis of rotation of the shaft 166 away from its perpendicular position, i.e. central or null position, is an indication that the vane 164 is not lined up with the direction of local flow of air. In other words, movement of the vane 164 about the axis of rotation of the shaft 166 senses a dynamic air pressure which is an indication that the vane is not lined up with the direction of local air flow. If, thereafter, the casing 170, is responsive to rotation of the shaft 166, turned to bring the vane 164 into line with the direction of local air flow, the dynamic air pressure sensed by the vane 164 will be reduced to zero and the new position of the casing 170 will therefore be a function of the direction of local air flow.

In order to thus interrelate the position of the vane 164, i.e. the angular position of the shaft 166 with respect to the casing 170, and the angular position of the casing 170 with respect to the sleeve 172, I have provided the circuit shown in FIG. 14 which cooperates with the reversible motor 182. However before going into the description of this circuit I wish to point out that the vane 164 may be of the so-called free swinging type, that is to say unbiased, although not necessarily so. I mention this to distinguish the device 160 in such respect from the second modified device which I will soon describe with respect to FIGS. 15 and 16.

Referring now to FIG. 14 the reference numeral 188 denotes the resistance winding of the potentiometer 176 which potentiometer is responsive to the angular position of the shaft 166 with respect to the casing 170. In effect this potentiometer 176 is a sensor for the deviation of the position of the vane 164 (deviation from its perpendicular projection position from the wing) with respect to the momentarily preceding direction of local air flow, the deviation being about an axis normal to the adjacent skin of the wing. The potentiometer 188 has a movable tap 190 driven by the shaft 166 so that said tap 190 and resistance 188 act as a pickoff mechanism that senses, i.e. is responsive to, the angular position of the shaft 166.

Leads 192, 194 connect the ends of the resistance winding 188 to a battery 196 and also to a voltage divider 198 from the tap point 200 of which a lead 202 runs to a junction 203 of a bridge 206. A lead 204 connects the movable tap 190 to the winding 207 of a polar relay 208, said winding in turn being connected by a lead 210 to the junction 212 of the bridge 206 opposite from the junction 203. It will be apparent that when the movable tap 190 swings to either side of a null position, i.e. a position which places no signal on the leads 202, 204, a signal will be supplied to the polar relay 208, the value of said signal depending upon the degree of deviation of the shaft 166, and the sign of said signal depending upon the direction of shift of said vane.

The polar relay 208 has a single pole double throw movable contact 214 which is adapted to engage either of two stationary contacts 216, 218 these latter being connected by leads 220, 222 to the field winding 224 of the reversible motor 182. The rotor winding of said motor has not been illustrated. A battery 226 connected by leads 228, 230 to the contact 214 and center tap 232 of the winding 224, respectively, selectively energizes the reversible motor in either direction. It will be apparent that when a current flows through the polar relay 208 in one direction the contact 214 will close with one or the other of the contacts 216 or 218 to turn the reversible motor in one direction and that when the current flow through the polar relay is reversed it will swing the contact 214 to the opposite stationary contact to drive the reversible motor in the opposite direction.

The motor is connected to turn the casing 170 through the pinion 180 and gear 178 in such a direction as to reduce the dynamic air pressure on and which has swung the vane 164 about the point P′ so as to tend to orient said vane 164 in a position in which with the vane in null position (zero output on the leads 202, 204) it is parallel to the local direction of air flow. The aforesaid position is an equilibrium position for the vane 164 so that when such position is reached no signal will be supplied by the potentiometer 176 and the reversible servomotor 182 will not drive the casing 170 any further unless and until the vane 164 is moved by a change in air flow direction and ensuing change in dynamic air flow pressure on said vane.

The bridge 206 constitutes three resistances 234, 236, and 238 connected in series with one another and with the actuating coil 240 of a lift utilization mechanism 242, such as an indicator having a needle 244 and a scale 246. The resistances 234, 236 meet at a junction 248; the resistances 236, 238 meet at the junction 212; the resistance 238 and the actuating winding 240 meet at a junction 250; and the actuating winding 240 and the resistance 234 meet at the junction 203. Because the signal output from the potentiometer 176 appearing on the leads 202, 204 flows through the actuating winding 240, when a signal is derived at the output of the potentiometer it will swing the needle 244 which thereby indicates the air flow characteristics.

Also connected to the bridge 206, and more particularly to the junctions 248, 250 thereof, is the output from the second pickoff transducer i.e. the potentiometer 184.

The reference numeral 252 indicates the resistance winding of said second potentiometer. The ends of this resistance winding are connected by leads 254, 256 to a battery 258 and to a voltage divider 260, the movable tap 262 of which is connected by a lead 264 to the junction 248. A lead 266 connects the movable tap 186 of the potentiometer 184 to the remaining junction 250.

It will be obvious that when a signal first appears across the leads 202, 204 the effect of said signal immediately becomes apparent in the indicator 242. This effect is not, at its inception, apparent in the signal appearing across the leads 264, 266. However as the signal across the leads 202, 204 wanes it is because the reversible servomotor 182 has been turning the casing 170 so that the vane 164 in its null orientation is being rotated into a position heading into the direction of flow of the local air mass. Said vane is being turned by rotation of the casing 170 with respect to the sleeve 172 and this change in angular position about the axis of rotation of the vane which is perpendicular to the skin of the wing is sensed by the angular pickoff potentiometer 184 which changes the signal appearing across the leads 264, 266, said signal either being increased or decreased. The signal appearing across the leads 264, 266 also passes through the winding 240 of the meter 242 and, therefore, as the casing 170 turns the signal furnished by it to the meter 242 will compensate for the change in the signal concurrently being furnished by the potentiometer 176 so that the meter reading does not change although its signal initially is the one furnished by the potentiometer 176 and eventually is furnished by the potentiometer 252. The circuit parameters including the various resistance values and the voltages furnished by the batterys 196, 258 are such as to give equal incremental outputs from the two pickoff systems for a given change in air flow characteristics.

To explain the operation of the modified device 160 let it be assumed that the aircraft is in flight and that the vane 164 is in its null position perpendicular to the adjacent skin of the wing and is oriented in the direction parallel to the local flow of air adjacent the skin of the wing. At this time the angular position of the casing 170 with respect to the sleeve 172 is a function of such direction of local air flow and this angular direction of air flow and, therefore, of the lift of said wing is sensed by the pickoff mechanism constituting the potentiometer 184 and its movable tap 186. The value thereof will be indicated on the meter 242, or, as has been pointed out earlier, can be employed to control any other suitable lift utilization mechanism. At this time the vane 164 has equal air pressures on its two broad surfaces since it is oriented in the direction of flow of the local air mass. There is, therefore no signal appearing across the output of the dynamic air flow sensor 176, i.e. there is no signal on the leads 202, 204.

If now the lift of the wing is changed, the dynamic air flow pressure on the vane 164 immediately will be unbalanced and will turn the shaft 166. The value of the angular signal developed is a function of the dynamic air flow pressure on the vane 164 before it turned. It is transduced into a voltage by the potentiometer 176 and the voltage appears on the leads 202, 204 and is fed into the indicator 242 which immediately shows the change in the direction of local air flow and therefore the changed value of lift. At the same time the voltage signal appearing on the leads 202, 204 is fed to the winding 207 of the polar relay 208 thus actuating the reversible motor 182 which thereupon and at a slower angular speed swings the vane 164 into such position that in its null position the net dynamic air flow pressure on the vane is zero. As the latter change takes place the needle 244 of the indicator 242 does not move.

It thus will be clear that I have provided an arrangement which swings the sensing vane in the direction of local air flow about an axis perpendicular to the adjacent skin of the wing so that its angular position about such axis is continuously responsive to the direction of local flow of air in the region of influence of the shifting stagnation point of the swept back airplane wing.

Figure 15:
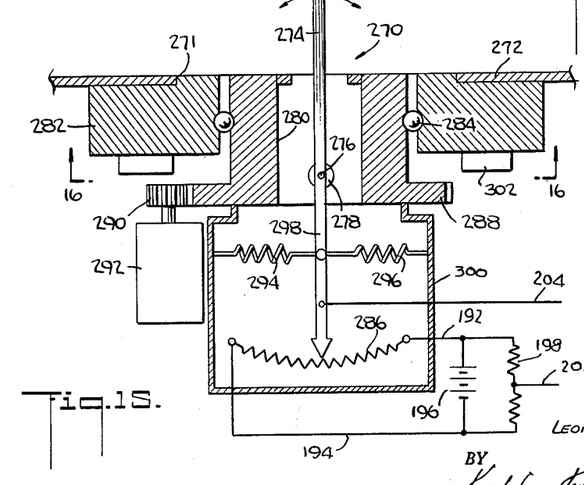
FIG. 15 is a view similar to FIG. 13 of still another modified form of my invention.

In FIGS. 15 and 16 I have shown still another form of lift measuring devices 270 which is generally similar to the device 160 but differs therefrom in that the axis of rotation of the sensing vane is parallel to the adjacent skin of the wing and perpendicular to the second axis of rotation of the vane which latter is normal to the adjacent skin of the wing. The device 270 further differs from the device 160 in that the vane is spring biased, that is to say spring loaded instead of being free swinging, in order to provide aerodynamic stability.

More specifically, the device 270 is mounted in an opening 271 in the skin 272 of the wing of the swept back airplane being located near the leading edge of the wing and on the under-surface thereof. Said device includes a flat vane 274 mounted to turn on and with a shaft 276 the opposite ends of which are journalled in antifriction bearings 278 that are carried by a casing 280. The axis of rotation of the shaft 276 is parallel to the adjacent skin of the wing. The casing 280 turns in a sleeve 282 through the use of anti-friction bearings, such as ballbearings 284, that roll in cooperating races formed in said casing 280 on the sleeve 282. The axis of rotation of the casing 280 relative to the sleeve 282 is an axis normal to the adjacent skin of the wing, the axis of rotation of the shaft 276 with respect to the casing 280 being perpendicular to the axis of rotation of the casing 280 with respect to the sleeve 282. Thus the vane 274, like the vane 164, can experience rotation about two axes one of which is normal to the skin of the wing and the other of which has a substantial component parallel to the skin of the wing.

The angular position of the vane 274 with respect to the casing 280, i.e. the angular position of the shaft 276 with respect to said casing, is transduced into an electric signal by a pickup potentiometer 286.

The casing 280 has fixed thereto a gear 288 engaged by a driving pinion 290 turned by a reversible motor 292.

The angular orientation of the vane 274 and shaft 276 with respect to the casing 280 is spring biased to a central or null position by a pair of opposed helical springs 294, 296 one pair of common ends of which are secured to the movable arm 298 of the potentiometer 286 and the other ends of which are anchored, as to a frame 300 carried by the casing 280.

The angular position of the casing 280 with respect to the sleeve 282 is picked up by a potentiometer 302 the resistance section of which is mounted on the sleeve 282 and the movable tap 304 of which is secured to the casing 280.

The circuit for the device 270 is the same as the circuit already shown and described in detail for the device 160 and to prevent iteration will not be repeated. The operation of the device 270 likewise is similar to that of the device 160 except for the effect of the springs 294, 296 and change in axis of rotation of the shaft 276 which only relate to the sensitivity of the device and not to its manner of operation.

It will be appreciated that potentiometers need not be the pickoff means employed and that it is within the scope of my invention to employ any other type of pickoff means, such, for instance, as the electromagnetic pickoff of FIGS. 8 and 9 or a synchro pickoff, these being well known in the art.

Attention also is called to the fact that although the signals from the two pickoffs in both devices 160, 270 are added in a bridge circuit for controlling a single lift utilization mechanism, these two pickoff signals are isolated in their individual circuits. This enables the reversible motor to be responsive principally to the dynamic air flow pressure and to be substantially independent of the air flow direction, such operation, of course, being desirable for the best functioning of my invention.

It will thus be seen that I have provided devices which achieve the several objects of my invention and are well adapted to meet the conditions of practical use.

As various possible embodiments might be made of the above invention and as various changes might be made in the embodiments above set forth it is to be understood that all matter herein described or shown in the accompanying drawings is to be interpreted as illustrative and not in a limiting sense.

Having thus described my invention, I claim as new and desire to secure by Letters Patent:

1. In combination, a swept back airplane wing having a shifting stagnation point and in which the direction of local flow of air in the region of influence of said stagnation point has an appreciable outboard component adjacent the skin of the wing and varies as a substantially exclusive function of lift, and means angularly movable with respect to an axis having a substantial component normal to the adjacent skin of the wing and having an angular orientation that is continuously responsive to the direction of local flow of air adjacent the skin of the wing in the region of influence of said stagnation point.

2. In combination, a swept back airplane wing having a shifting stagnation point and in which the direction of local flow of air in the region of influence of said stagnation point has an appreciable outboard component adjacent the skin of the wing and varies as a substantially exclusive function of lift, means angularly movable with respect to an axis having a substantial component normal to the adjacent skin of the wing and having an angular orientation that is continuously responsive to the direction of local flow of air adjacent the skin of the wing in the region of influence of said stagnation point, and means controlled by said angularly movable means providing an output variable as a direct function of said angular movement.

3. In combination, a swept back airplane wing having a shifting stagnation point and in which the direction of local flow of air in the region of influence of said stagnation point has an appreciable outboard component adjacent the skin of the wing and varies as a substantially exclusive function of lift, means angularly movable with respect to an axis having a substantial component normal to the adjacent skin of the wing and having an angular orientation that is continuously responsive to the direction of local flow of air adjacent the skin of the wing in the region of influence of said stagnation point, and means controlled by said angularly movable means and providing an electrical output variable as a direct function of said angular movement.

4. In combination, a swept back airplane wing having a shifting stagnation point and in which the direction of local flow of air in the region of influence of said stagnation point has an appreciable outboard component adjacent the skin of the wing and varies as a substantially exclusive function of lift, means angularly movable with respect to an axis having a substantial component normal to the adjacent skin of the wing and having an angular orientation that is continuously responsive to the direction of local flow of air adjacent the skin of the wing in the region of influence of said stagnation point, means controlled by said angularly movable means and providing an output variable as a function of said angular movement, and a utilization mechanism regulated by said second named means.

5. In combination, a swept back airplane wing having a shifting stagnation point and in which the direction of local flow of air in the region of influence of said stagnation point has an appreciable outboard component adjacent the skin of the wing and varies as a substantially exclusive function of lift, and free swinging means angularly movable with respect to an axis having a substantial component normal to the adjacent skin of the wing and having an angular orientation that is continuously responsive to and essentially an exclusive function of the direction of local flow of air adjacent the skin of the wing in the region of influence of said stagnation point.

6. In combination, a swept back airplane wing having a shifting stagnation point and in which the direction of local flow of air in the region of influence of said stagnation point has an appreciable outboard component adjacent the skin of the wing and varies as a substantially exclusive function of lift, and spring loaded means angularly movable with respect to an axis having a substantial component normal to the adjacent skin of the wing and having an angular orientation that is continuously responsive to the direction of local flow of air adjacent the skin of the wing in the region of influence of said stagnation point.

7. In combination, a swept back airplane wing having a shifting stagnation point and in which the direction of local flow of air in the region of influence of said stagnation point has an appreciable outboard component adjacent the skin of the wing and varies as a substantially exclusive function of lift, and power driven means angularly movable with respect to an axis having a substantial component normal to the adjacent skin of the wing and having an angular orientation that is continuously responsive to and essentially an exclusive function of the direction of local flow of air adjacent the skin of the wing in the region of influence of said stagnation point.

8. In combination, a swept back airplane wing having a shifting stagnation point and in which the direction of local flow of air in the region of influence of said stagnation point has an appreciable outboard component adjacent the skin of the wing and varies as a substantially exclusive function of lift, and means angularly movable with respect to an inboard axis having a substantial component normal to the adjacent skin of the wing and having an angular orientation that is continuously responsive to the direction of local flow of air adjacent the skin of the wing in the region of influence of said stagnation point.

9. In combination, a swept back airplane wing having a shifting stagnation point and in which the direction of local flow of air in the region of influence of said stagnation point has an appreciable outboard component adjacent the skin of the wing and varies as a substantially exclusive function of lift, and means angularly movable with respect to an axis substantially normal to the adjacent skin of the wing and having an angular orientation that is continuously responsive to the direction of local flow of air adjacent the skin of the wing in the region of influence of said stagnation point.

10. A lift measuring device for installation on a swept back airplane wing having a shifting stagnation point and in which the direction of local flow of air in the region of influence of said stagnation point has an appreciable outboard component adjacent the skin of the wing and varies as a substantially exclusive function of lift, said device comprising a vane, a first member, a second member, said second member being adapted to be fixed to the airplane wing, means mounting the first member on and for rotation with respect to the second member about an axis having a substantial component normal to the adjacent skin of the wing, means mounting the vane on and for rotation with respect to the first member about an axis having a substantial component parallel to the adjacent skin of the wing, sensing means responsive to movement of the vane with respect to its axis of rotation relative to the first member, and power means responsive to the sensing means for varying the angular position of the first member with respect to the second member so as to turn said vane into the direction of local flow of air adjacent the skin of the wing in the region of influence of said stagnation point.

11. A device as set forth in claim 10 wherein further means is included which is controlled by the angular position of the first member with respect to the second member and provides an output variable as a function of said angular position.

12. A device as set forth in claim 11 wherein means controlled by the sensing means provides an output variable as a function of the angular movement of the vane with respect to the first member and wherein means further is included to add the two outputs.

13. A lift measuring device for installation on a swept back airplane wing having a shifting stagnation point and in which the direction of local flow of air in the region of influence of said stagnation point has an appreciable outboard component adjacent the skin of the wing and varies as a substantially exclusive function of lift, said device comprising a vane projecting through the skin of the wing and angularly movable with respect to an axis having a substantial component normal to the adjacent skin of the wing, said vane having an angular orientation that is continuously responsive to the direction of local flow of air adjacent the skin of the wing in the region of influence of said stagnation point, and means controlled by said vane and providing an output variable as a substantially exclusive function of the lift of the airplane.

14. A lift measuring device for installation on a swept back airplane wing having a shifting stagnation point and in which the direction of local flow of air in the region of influence of said stagnation point has an appreciable outboard component adjacent the skin of the wing and varies as a substantially exclusive function of lift, said device comprising means angularly movable with respect to an axis having a substantial component normal to the adjacent skin of the wing and having an angular orientation that is continuously responsive to the direction of local flow of air adjacent the skin of the wing in the region of influence of said stagnation point, the axis of the angularly movable means being skewed at an angle within 60° to the normal to the adjacent skin of the wing, and means controlled by said angularly movable means and providing an output variable as a substantially exclusive function of the lift of the airplane.

15. A device as set forth in claim 14 wherein the angularly movable means includes a plane vane and wherein the axis of the angularly movable means is in the plane of the vane.

16. A lift measuring device for installation on a swept back airplane wing having a shifting stagnation point and in which the direction of local flow of air in the region of influence of said stagnation point has an appreciable outboard component adjacent the skin of the wing and varies as a substantially exclusive function of lift, said device comprising means angularly movable with respect to an axis having a substantial component normal to the adjacent skin of the wing and having an angular orientation that is continuously responsive to the direction of local flow of air adjacent the skin of the wing in the region of influence of said stagnation point, and a magnetic flux transducer controlled by said angularly movable means and providing an output variable as a substantially exclusive function of the lift of the airplane.

17. A lift measuring device for installation on a swept back airplane wing having a shifting stagnation point and in which the direction of local flow of air in the region of influence of said stagnation point has an appreciable outboard component adjacent the skin of the wing and varies as a substantially exclusive function of lift, said device comprising means angularly movable with respect to an axis having a substantial component normal to the adjacent skin of the wing and having an angular orientation that is continuously responsive to the direction of local flow of air adjacent the skin of the wing in the region of influence of said stagnation point, power means to drive the angularly movable means responsive to the change in direction of local air flow adjacent the skin of the wing so that its angular orientation is continuously responsive to such direction of flow, and means controlled by said angularly movable means and providing an output variable as a substantially exclusive function of the lift of the airplane.

18. A lift measuring device for installation on a swept back airplane wing having a shifting stagnation point and in which the direction of local flow of air in the region of influence of said stagnation point has an appreciable outboard component adjacent the skin of the wing and varies as a substantially exclusive function of lift, said device comprising means angularly movable with respect to an axis having a substantial component normal to the adjacent skin of the wing and having an angular orientation that is continuously responsive to the direction of local flow of air adjacent the skin of the wing in the region of influence of said stagnation point, means to sense change in position of the angularly movable means responsive to change in direction of the local air flow adjacent the skin of the wing in the region of influence of said separation point, power means to move the angularly movable means responsive to the sensing means so that said angularly movable means will assume an angular orientation that is continuously responsive to such direction of air flow, and means controlled by said angularly movable means and providing an output variable as a substantially exclusive function of the lift of the airplane.

19. A lift measuring device for installation on a swept back airplane wing having a shifting stagnation point and in which the direction of local flow of air in the region of influence of said stagnation point has an appreciable outboard component adjacent the skin of the wing and varies as a substantially exclusive function of lift, said device comprising means angularly movable with respect to an axis having a substantial component normal to the adjacent skin of the wing and having an angular orientation that is continuously responsive to the direction of local flow of air adjacent the skin of the wing in the region of influence of said stagnation point, means to sense change in air flow pressure on the angularly movable means, power means to move the angularly movable means responsive to the sensing means, and means controlled by said angularly movable means and providing an output variable as a substantially exclusive function of the lift of the airplane.

References Cited in the file of this patent

UNITED STATES PATENTS

| | | |
|---|---|---|
| 2,660,056 | Schuck et al. | Nov. 24, 1953 |
| 2,716,228 | Greene | Aug. 23, 1955 |

FOREIGN PATENTS

| | | |
|---|---|---|
| 701,844 | Great Britain | Jan. 6, 1954 |